(12) United States Patent
Serizawa et al.

(10) Patent No.: US 6,657,812 B2
(45) Date of Patent: Dec. 2, 2003

(54) DISK DRIVE INCLUDING A DUST CATCHING CHAMBER AND AN ASSOCIATED GASKET PORTION

(75) Inventors: Kohji Serizawa, Yokohama (JP); Yoshihiro Hirasaka, Sagamihara (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 205 days.

(21) Appl. No.: 09/956,183

(22) Filed: Sep. 19, 2001

(65) Prior Publication Data

US 2002/0044376 A1 Apr. 18, 2002

(30) Foreign Application Priority Data

Oct. 13, 2000 (JP) ........................................ 2000-313252

(51) Int. Cl.⁷ .............................................. G11B 33/14
(52) U.S. Cl. ................................................... 360/97.02
(58) Field of Search ........................... 360/97.02, 97.03

(56) References Cited

U.S. PATENT DOCUMENTS

| | | | | |
|---|---|---|---|---|
| 4,282,554 A | * | 8/1981 | Ho et al. ................. | 360/97.02 |
| 5,101,305 A | * | 3/1992 | Ohkita et al. ............ | 360/97.02 |
| 5,282,100 A | * | 1/1994 | Tacklind et al. ......... | 360/97.02 |
| 5,446,609 A | * | 8/1995 | Thanos et al. ........... | 360/97.02 |
| 5,546,250 A | * | 8/1996 | Diel ........................ | 360/97.02 |
| 5,598,306 A | * | 1/1997 | Frees et al. .............. | 360/97.02 |
| 5,631,787 A | * | 5/1997 | Huang et al. ............ | 360/97.02 |
| 5,754,365 A | * | 5/1998 | Beck et al. .............. | 360/97.02 |
| 6,008,965 A | * | 12/1999 | Izumi et al. ............. | 360/97.03 |
| 6,214,070 B1 | * | 4/2001 | Crowder et al. .............. | 55/320 |
| 6,507,452 B1 | * | 1/2003 | Bae et al. ................ | 360/97.02 |

* cited by examiner

Primary Examiner—Jefferson Evans
(74) Attorney, Agent, or Firm—Robert B. Martin; Bracewell & Patterson, L.L.P.

(57) ABSTRACT

A hard disk drive contains a disk assembly and a cylindrical disk container. The drive also includes a base around which a peripheral wall extends, a catching chamber including a partition wall partitioning the base into the catching chamber and a disk container, and a top cover functioning as a lid of the base. In addition, the hard disk drive has a first gasket as a first gasket section existing between the top cover and a peripheral wall of the base, and a second gasket as a second gasket section existing between the top cover and the partition wall of the catching chamber.

9 Claims, 10 Drawing Sheets

| Type | Pf(mmH$_2$O) | Pr(mmH$_2$O) | Pressure Loss (L) | Pressure Ratio (R) |
|---|---|---|---|---|
| Present Invention | 10.4 | −0.9 | 11.3 | 8.0 |

(b)

| Type | P'f(mmH$_2$O) | P'r(mmH$_2$O) | Pressure Loss (L') | Pressure Ratio (R') |
|---|---|---|---|---|
| Conventional Example | 8.2 | −2.6 | 10.8 | 24.0 |

DISK DRIVE INCLUDING A DUST CATCHING CHAMBER AND AN ASSOCIATED GASKET PORTION

BACKGROUND OF THE INVENTION

1. Field of the Invention

The present invention relates to a disk drive apparatus that is represented by a hard disk drive, and in particular, to technology for improving a collection efficiency of a dust filter in a disk drive apparatus.

2. Background Art

A hard disk drive that is the most general as data storage means of a computer (hereinafter, an HDD) has the structure of locating one or a plurality of magnetic disk platters in the same shaft and driving the one or plurality of magnetic disk platters by a spindle motor. Reading and writing is performed by a magnetic head which is provided with facing respective surfaces of the magnetic disk, and this magnetic head is driven by an actuator, that is, a voice coil motor (hereinafter, a VCM) in general. The above-described magnetic disk, magnetic head, and actuator are contained in a housing that is called a disk enclosure. The disk enclosure consists of a base made of a shallow-box-like aluminum alloy and a top cover sealing an opening section of the base.

Main technical subjects in HDDs are to improve memory capacity per magnetic disk platter, and to improve reading speed of data, stored in a magnetic disk, and writing speed of data into the magnetic disk. As for the latter, it is possible to improve reading and writing speed of data by shortening seek time when the magnetic head moves to a necessary track on the magnetic disk. Since the magnetic head is driven by a VCM as described above, it is possible to accelerate the seek time by enhancing the performance of this VCM. In order to enhance the performance of the VCM, it is sufficient just to adopt another permanent magnet that configures the VCM and has a stronger magnetic characteristic, or to enlarge a magnetic field applied to the voice coil by making the permanent magnet thicker. Nevertheless, the enhancement of the magnetic characteristic of a permanent magnet is also near to its limit. Furthermore, in an HDD that is requested to be small, there is a limit to make a permanent magnet thicker than a current one.

In addition, by accelerating the rotational speed of a magnetic disk, it is possible to improve the reading and writing speed of data. Nevertheless, if the rotational speed of a magnetic disk is accelerated, a probability that dust collides with a magnetic head becomes higher even if the same number of dust exists in an HDD. This collision may cause a damage of the magnetic head, and magnetic disk. On the other hand, because the floating height of a magnetic head from a magnetic disk is also lowered so as to correspond to capacity expansion of the magnetic disk, there is a possibility of collision even if the dust has small size that has not been a big issue up to now. Therefore, dust reduction in an HDD becomes an important subject.

Because a disk enclosure configuring an HDD consists of a base and a top cover, and an opening section of the base is sealed by the top cover, dust hardly enters into the HDD after the assembly of the HDD. Therefore, dust becoming a problem is mixed inside the disk enclosure in the process of assembling the HDD. The HDD has a catching mechanism to catch this dust.

Figure 9:
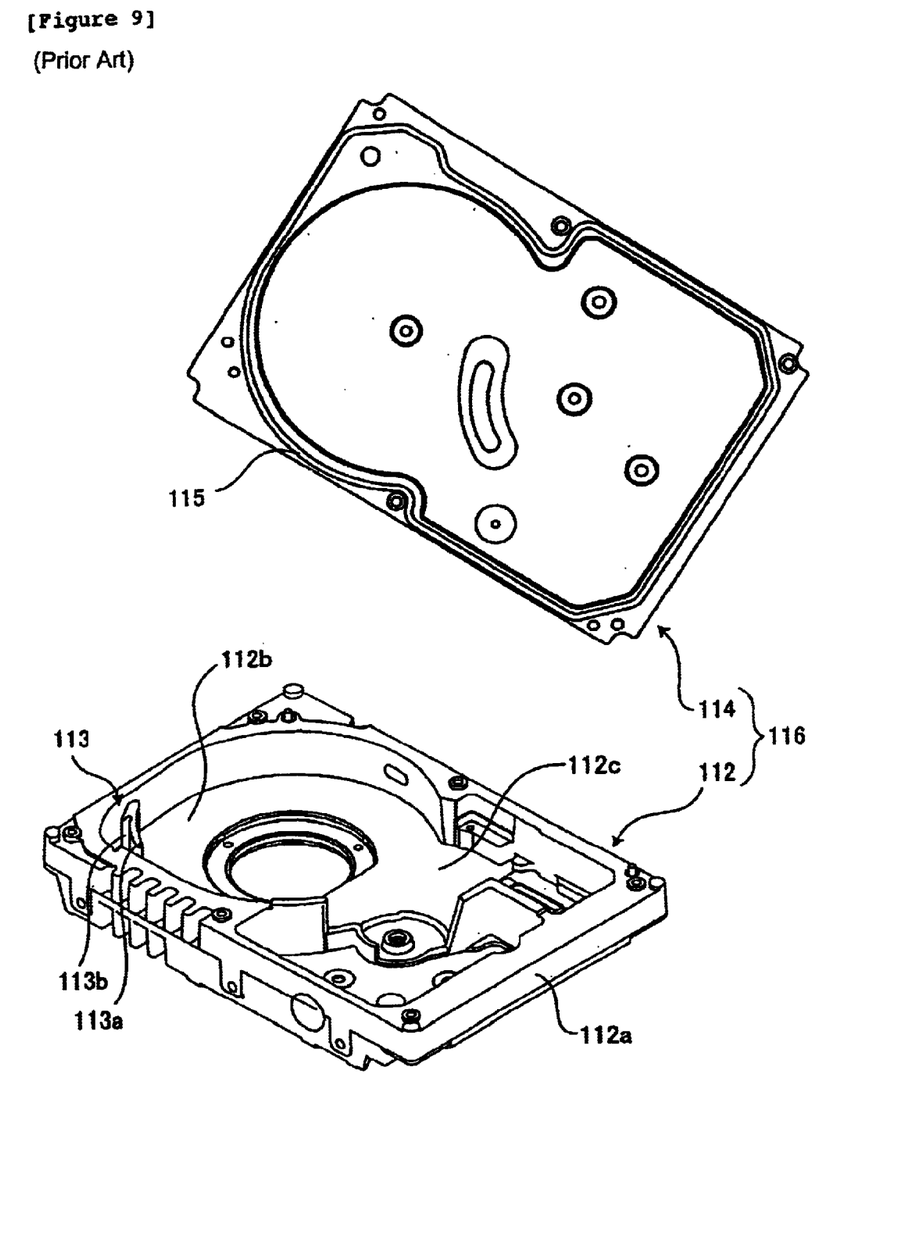
FIG. 9 is an exploded perspective view of a disk enclosure for a conventional HDD.
Figure 10:
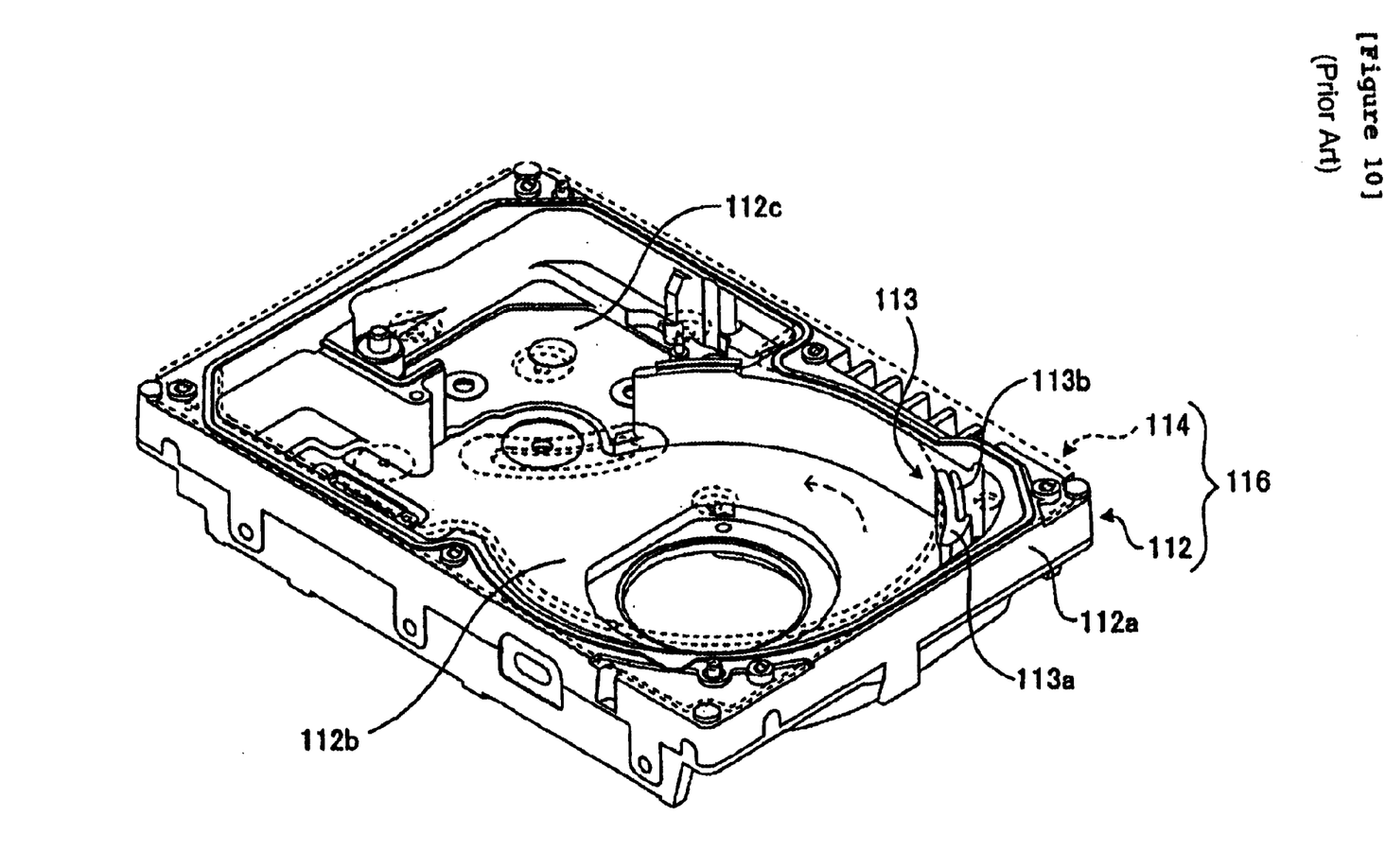
FIG. 10 is a perspective view of the conventional HDD.

FIGS. 9 and 10 are perspective views showing the configuration of a disk enclosure 116 configuring a conventional HDD. FIG. 9 shows a condition that a base 112 and a top cover 114 are separated from each other, and FIG. 10 shows a condition that the top cover 114 is mounted on the base 112. In addition, the top cover 114 shown in FIG. 9 is a backside facing the base 112. Furthermore, in FIG. 10, in order that the inside of the base 112 can be observed, the top cover 114 is shown in a transparent condition.

The base 112 has a peripheral wall 112a that is stood around its outer periphery. In an area surrounded by the peripheral wall 112a, there are a disk container 112b containing a disk assembly that consists of a magnetic disk and a spindle motor rotationally driving the magnetic disk, and an actuator container 112c accommodating an actuator mechanism for making a magnetic head seek a track on the magnetic disk. The catching mechanism 113 of dust is located in the outer periphery of the disk container 112b.

Figure 4:
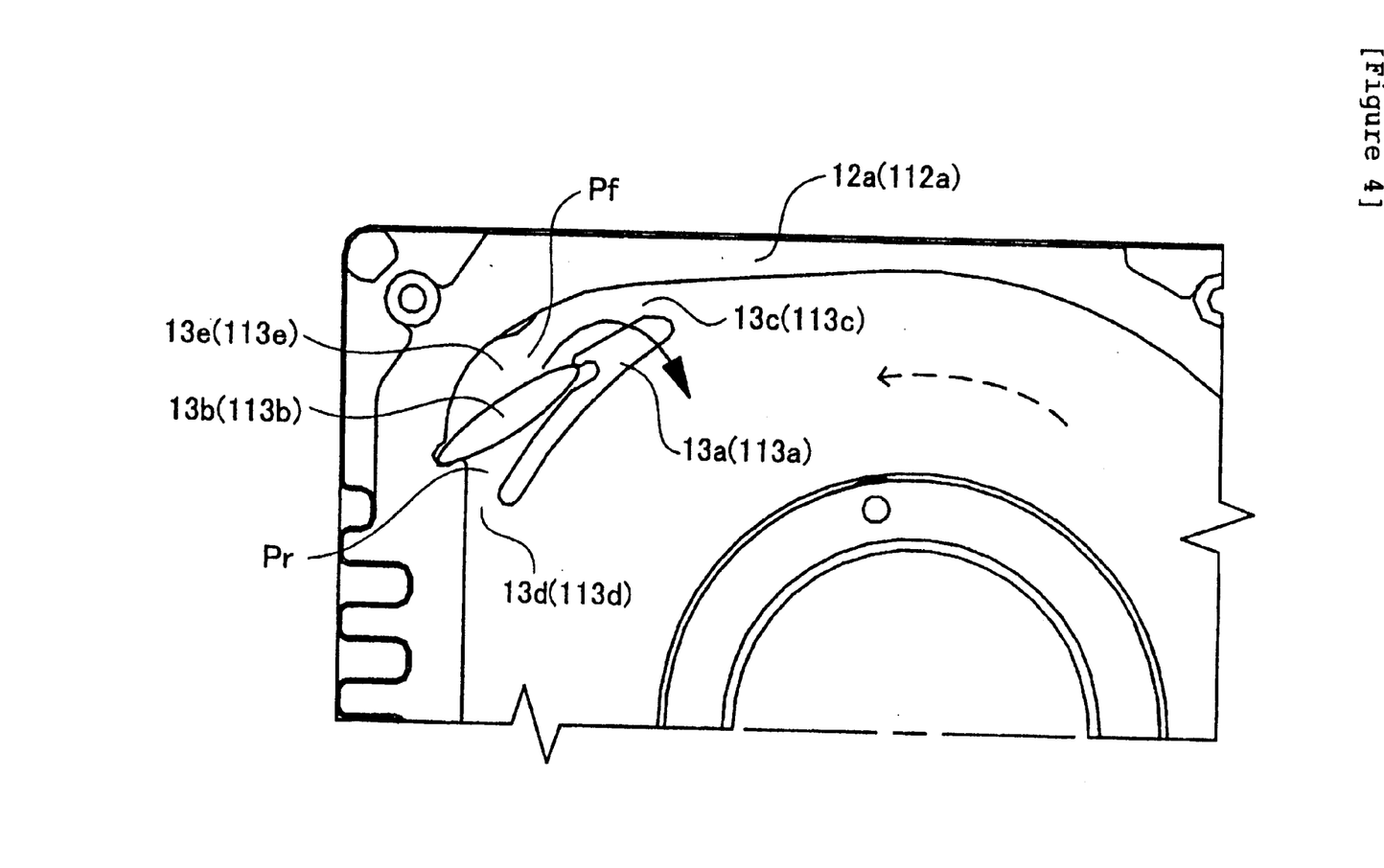
FIG. 4 is an enlarged top view of a catching mechanism of the HDD.

An enlarged top view showing the vicinity of the catching mechanism 113 is shown in FIG. 4. The catching mechanism 113 has a partition wall 113a, stood at a predetermined distance from the peripheral wall 112a of the base 112, and a filter 113b, located between the peripheral wall 112a and partition wall 113a. A catching chamber 113e is formed between the partition wall 113a and peripheral wall 112a, and an inlet 113c is formed in one end of the catching chamber 113e and an outlet 113d is in another end.

Since the magnetic disk turns counterclockwise (shown by a dotted arrow in the figure), a counterclockwise air stream occurs in the disk container 112b. Dust in the HDD floats with this air stream. As for this air stream, because linear velocity caused by the rotation of the magnetic disk becomes larger as going to the outer periphery, dust moves along the peripheral wall 112a. In addition, the dust enters the catching mechanism 113 from the inlet 113c with the air stream, and is caught by the filter 113b. The air stream after the dust being caught is exhausted from the outlet 113d. Although the dust in the HDD is caught in this manner, it is requested to improve a collection efficiency of the filter 113b in connection with accelerating the rotation speed of the magnetic disk. Then, the present invention is intended to improve a dust collection efficiency in a disk drive apparatus represented by an HDD.

SUMMARY OF THE INVENTION

As an index for measuring the collection efficiency in the filter 113b, there is the pressure drop before and after the filter 113b. This is an evaluation method adopted also in IDEMA (International Disk Drive Equipment Material Association). Thus, in FIG. 4, let pressure before the filter 113b be Pf and let pressure after the filter 113b be Pr. The larger the pressure drop obtained from Pf-Pr is, the more volume of air passes the filter 113b. Assuming that dust is included uniformly in the air passing the catching mechanism 113, that more volume of air passes the filter 113b means that more volume of dust collides against and is caught by the filter 113b. Therefore, the present inventor investigated to enlarge the pressure drop (L) obtained from Pf-Pr.

It is possible to enlarge the pressure drop (L) by increasing Pf or decreasing Pr. Then, first, a review about structure of the catching mechanism 113 was performed about whether Pr could be increased. In order to increase Pr, it is effective to enhance airtightness in the catching chamber 113e that is a space formed by the partition wall 113a, filter 113b, peripheral wall 112a, and top cover 114. Nevertheless, it is confirmed that airtightness of the catching chamber 113e is not enough in the catching mechanism 113 of the conventional HDD.

Figure 5:
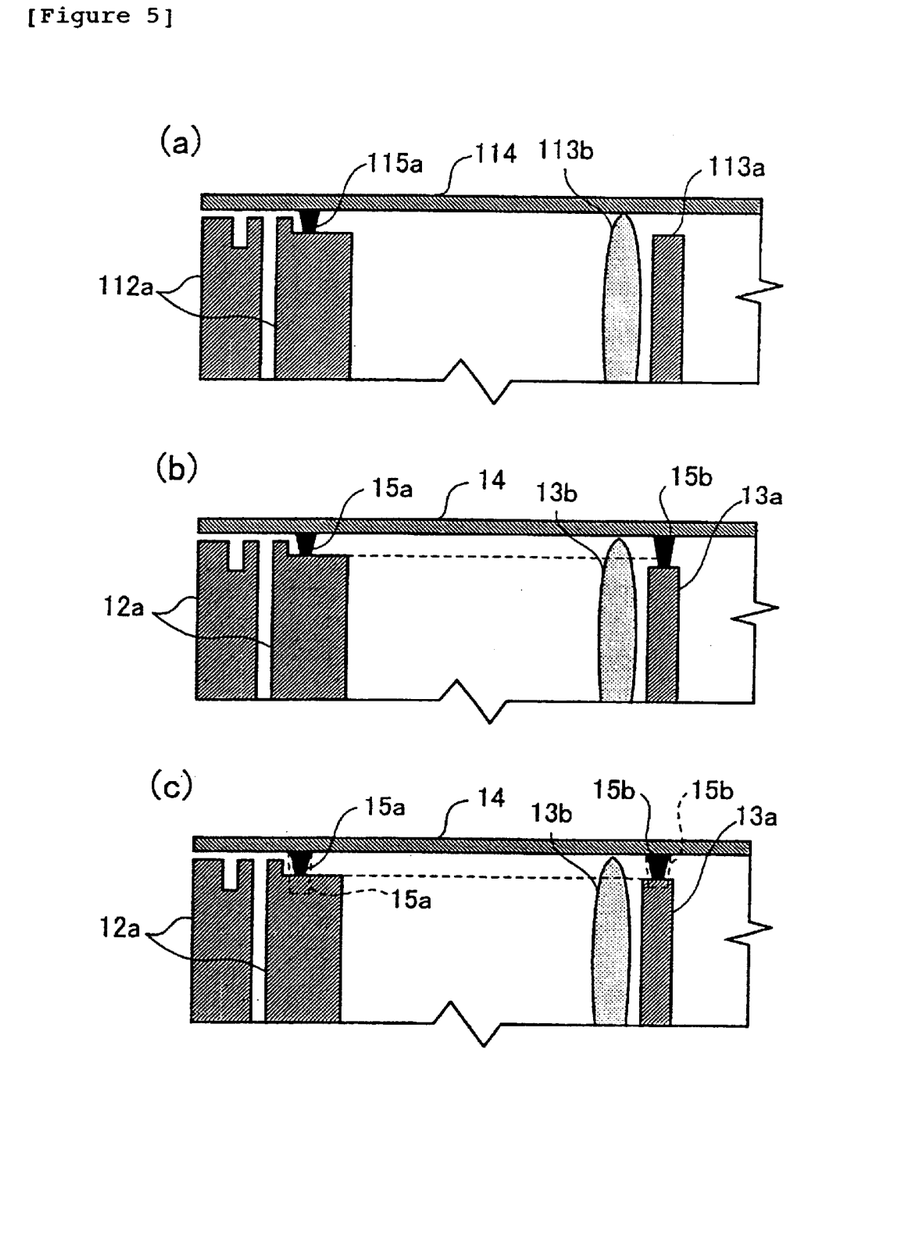
FIGS. 5A to 5C are partial sectional views showing the catching mechanism of the HDD.

As shown in FIGS. 9 and 10, a gasket 115 is provided in a back face of the top cover 114, and when the top cover 114 is mounted on the base 112, the gasket 115 is pressed on a top face of the peripheral wall 112a in the base 112 to secure airtightness against the outside. Here, a partial cross section of the catching mechanism 113 is shown in FIG. 5A, and according to the figure, a gap is formed between the partition wall 113a and top cover 114. This is because there was concern about not being able to secure the airtightness in the HDD because of the lack of contact pressure of the gasket 115 and peripheral wall 112a if the partition wall 113a contacts to the top cover 114. In general, although the base 112 consists of aluminum alloy formed by die casting, it is difficult to form highly precise parts by die casting. Owing to that, conventionally, the base 112 has been designed so that the contact of the partition wall 113a and top cover 114 is surely avoided. Therefore, for example, in such an aspect that is shown by a solid arrow in FIG. 4, an air stream leaks out from the catching chamber 113e. As described above, a gap between the partition wall 113a and top cover 114 becomes a large factor which obstructs the enhancement of airtightness in the catching chamber 113e. Nevertheless, that a gap between the partition wall 113a and top cover 114 existed was not a technical issue in HDDs before the rotational speed of a magnetic disk was highly accelerated.

Then, the present inventor planed to form such a wall that completely isolates the disk container 112b from the catching chamber 113e except the inlet 113c and outlet 113d. Therefore, the present invention is a disk drive apparatus characterized in comprising: a disk-like medium that is rotationally driven with a rotation axis as a center and stores data; a medium container accommodating the disk-like medium; a wall isolating a catching chamber from the medium container; an inlet introducing an air stream occurring by rotation driving of the disk-like medium; an outlet exhausting the air stream; and a catching chamber catching dust included in the air stream. The wall of the present invention can be implemented by providing a gasket, which is mounted with press on the partition wall 113a, on the top cover 114. Thus, it is possible to configure the wall by the partition wall 113a and gasket newly provided. Nevertheless, this is an example for easier comprehension of the wall, and hence, this does not become a ground of limiting the present invention.

In a disk drive apparatus of the present invention, by providing the wall, it becomes possible to prevent air streams from leaking from the catching chamber to the medium container. Therefore, the front pressure Pf of the filter 113b becomes large, and hence it is possible to increase the pressure loss (L).

In addition, in a disk drive apparatus of the present invention, the catching chamber can be located in an outer periphery of the medium container. This is because, in a disk drive apparatus, for example, an HDD, an air stream occurs by the rotation of a magnetic disk, and since the linear velocity of the air stream becomes larger as going to an outer peripheral area of a magnetic disk container, it is desirable in view of a collection efficiency to provide the catching chamber in the area. Moreover, in a disk drive apparatus of the present invention, a filter catching the dust can be provided between the inlet and outlet in the catching chamber.

A disk drive apparatus of the present invention can be applied to an HDD. Therefore, the present invention provides a hard disk drive characterized in comprising: a disk assembly that consists of a disk-like medium, magnetically storing data, and a spindle motor, rotationally driving the disk-like medium; an actuator that has a magnetic head to store data in and reproduce data from the disk-like medium, and that makes the magnetic head seek the disk-like medium and rotates the magnetic head with a pivot as a center; a base that accommodates the disk assembly and provides an approximately cylindrical disk container, and around which a peripheral wall is provided, a catching chamber which has an inlet and an outlet, communicating with the disk container, and a partition wall partitioning the disk container from the inlet and outlet; a top cover functioning as a lid of the base; a first gasket existing between the top cover and peripheral wall of the base; and a second gasket existing between the top cover and partition wall of the catching chamber.

Because the hard disk drive of the present invention has the second gasket between the partition wall and top cover of the catching chamber, insulation between the disk container and catching chamber is realized by the partition wall and gasket. Owing to this, it is possible to prevent an air stream from leaking from the catching chamber to the disk container.

In the present invention, although a wall can be formed by making a partition wall high to a top cover, as described above, it is not easy to strictly control the height of the partition wall. Therefore, it is desirable in the present invention to form a gasket, consisting of an elastic body, as a part of a component of the wall.

In a hard disk drive of the present invention, it is possible to form the first gasket and second gasket in one piece. Hence it is possible to reduce a manufacturing cost of the gaskets, and to perform mounting operation to the top cover only once. The gasket of the present invention can be made of, for example, rubber such as fluororubber. In that case, it is possible to form the gasket with unifying the first gasket and second gasket by forming a cavity obtained by combining the first gasket and second gasket.

In a hard disk drive of the present invention, it is desirable that the height of the partition wall is lower than the height of the peripheral wall. Although this will be described in detail in "Preferred embodiment", it is because it is effective to keep airtightness by the first gasket if it is assumed that the first gasket and second gasket are equal in thickness.

The present invention provides the above-described gasket used in a disk drive apparatus, or a hard disk drive. A gasket that is mounted in a disk drive apparatus whose inside is partitioned into a plurality of partitions, and the gasket is characterized in comprising: a first gasket section forming a loop for keeping airtightness of the disk drive apparatus against the outside; and a second gasket section that configures walls between the plurality of partitions inside the disk drive apparatus and is unified with the first gasket section.

In a gasket of the present invention, it is possible that the disk drive apparatus comprises a medium container accommodating a disk-like medium, and a catching chamber catching dust in the disk drive apparatus, and that the second gasket section keeps airtightness between the medium container and catching chamber. Furthermore, in a gasket of the present invention, it is desirable that the height of the second gasket section is lower than the height of the first gasket section.

The present invention provides a top cover that configures a disk enclosure of a hard disk drive with a box-like base, the top cover comprising: a flat cover body; a looped first gasket that is fixed around the cover body and is to keep airtightness of the disk enclosure from the outside; and a second gasket that is fixed to the cover body in a loop of the first gasket, and configures a wall in the disk enclosure.

BRIEF DESCRIPTION OF THE DRAWINGS

So that the manner in which the features, advantages and objects of the invention, as well as others which will become apparent, are attained and can be understood in more detail, more particular description of the invention briefly summarized above maybe had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
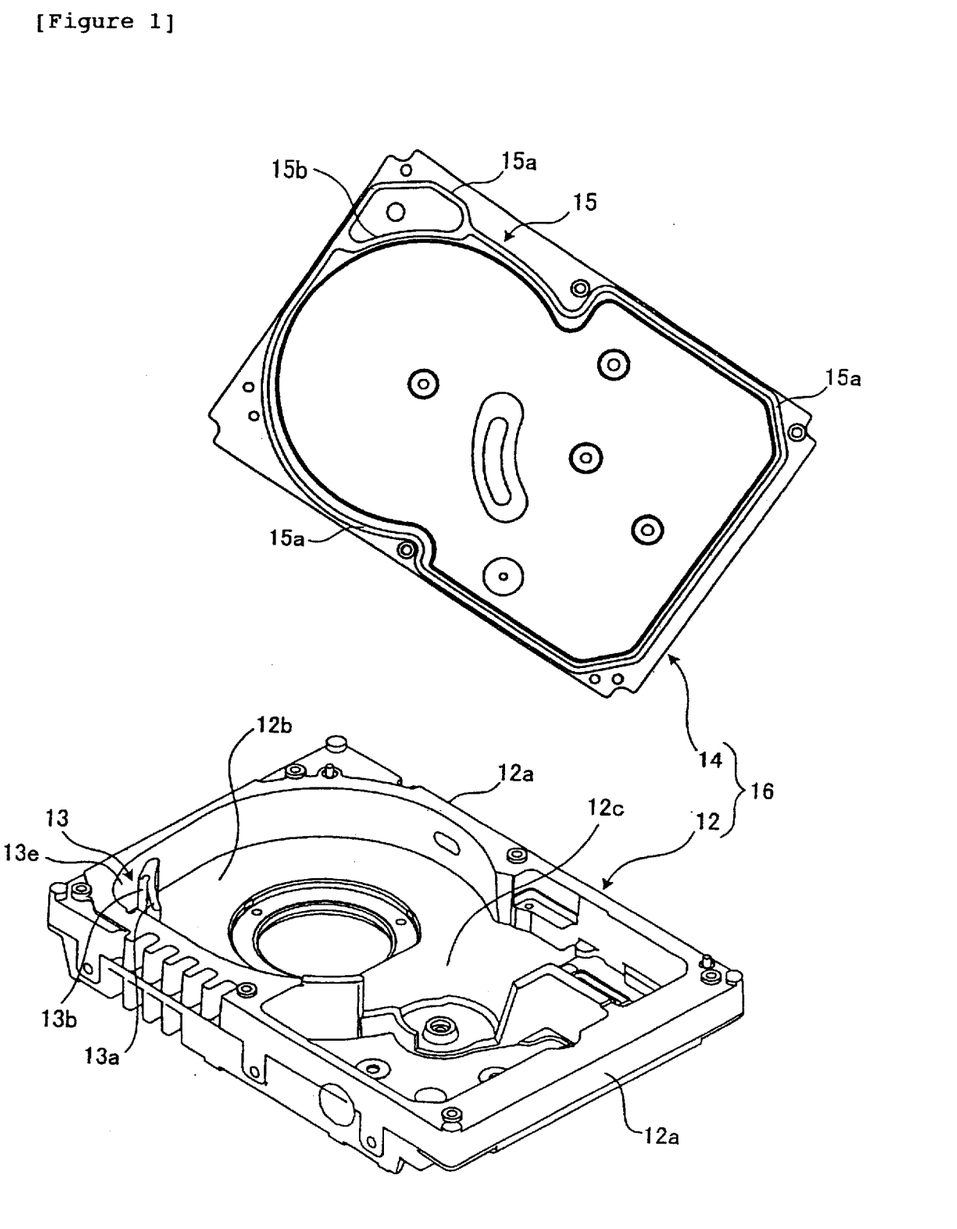
FIG. 1 is an exploded perspective view of one embodiment of a disk enclosure for a HDD constructed in accordance with the present invention.
Figure 2:
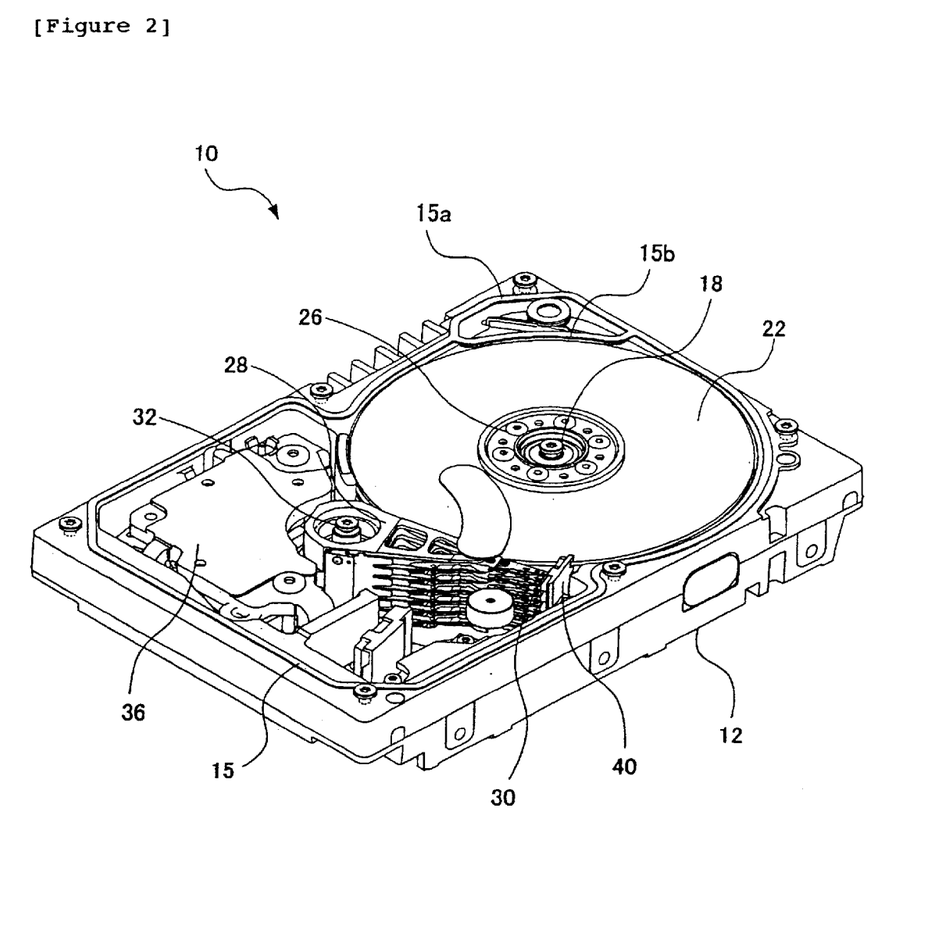
FIG. 2 is a perspective view of the HDD of FIG. 1.
Figure 3:
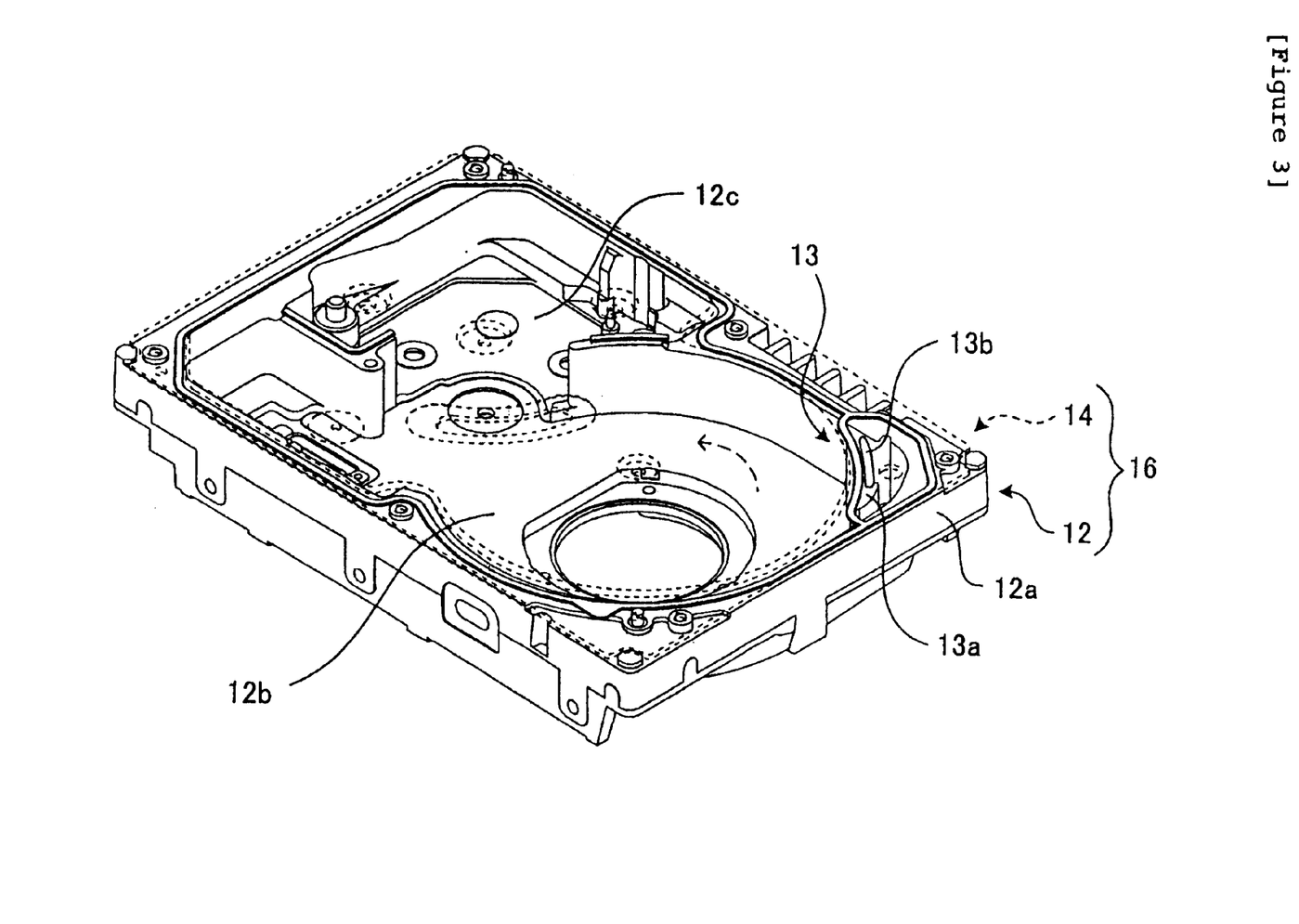
FIG. 3 is a perspective view showing an interior of the HDD.

Hereinafter, an example of applying a disk drive apparatus according to the present invention to a hard disk drive (HDD) 10 will be described with referring to drawings. In the HDD 10, as shown in FIGS. 1 to 3, a disk enclosure 16 is configured by encapsulating a shallow-box type base 12, which is made of aluminum alloy, with a top cover 14. A gasket 15 is bonded on a back face of the top cover 14. The gasket 15 can be made of, for example, fluororubber. Since the top cover 14 is screwed on the base 12 through the gasket 15, the inside of the disk enclosure 16 is hermetically sealed. In this disk enclosure 16, as shown in FIG. 2, a spindle motor 18 having hub-in construction is provided in the approximate center of the base 12. On an upper face of a hub (not shown) of this spindle motor 18, a magnetic disk 22 consisting of glass or aluminum substrates is fixedly mounted with a top clamp 26 through a spacer (not shown) with being coaxially stacked.

In addition, in the disk enclosure 16, an actuator 28 is provided. This actuator 28 has a magnetic head 30, which performs reading and writing of data, in one end section, its middle section is supported on the base 12 through a pivot 32, and the actuator 28 is made to be rotatable around the pivot 32. In another end section of the actuator 28, a VCM (voice coil motor) coil is provided, and the actuator 28 is rotated by a VCM 36, provided inside the disk enclosure 16 so as to collaborate with this VCM coil.

On an outer face (bottom face) of the base 12, a card, not shown, is mounted as a circuit board, and this card is made to be a rectangle having such dimensions that this card covers a half of the outer face of the base 12. Between the card and spindle motor 18, power, signals, and the like for motor driving are inputted and outputted, and between the card and actuator 28, power and signals for driving of the VCM coil, reading of the magnetic heads 30, and the like are inputted and outputted. These inputs and outputs between this card and actuator 28 are performed through the flexible cable (FPC).

The HDD 10 according to this embodiment is a disk drive apparatus called ahead load/unload type HDD. This head load/unload type HDD unloads the magnetic heads 30 to a parking position without contacting the magnetic head 30 with surfaces of the magnetic disk 22 by making a ramp block 40 hold the actuator 28 in an idle state. In operation, by being driven by the actuator 28, the magnetic head 30 is sought above the magnetic disk 22.

The base 12 has a peripheral wall 12a that is stood around its outer periphery. The base 12 is partitioned as follows into a plurality of areas. Thus, a disk container 12b as a medium container, containing a disk assembly that consists of the magnetic disk 22 and spindle motor 18 rotationally driving the magnetic disk 22, and an actuator container 12c accommodating an actuator mechanism for making the magnetic head 30 perform seek above the magnetic disk 22 are provided in an area surrounded by the peripheral wall 12a. A dust catching mechanism 13 is located in the disk container 12b.

An enlarged top view showing the vicinity of the catching mechanism 13 is shown in FIG. 4. The catching mechanism 13 has a partition wall 13a, stood at a predetermined distance from the peripheral wall 12a of the base 12, and a filter 13b, located between the peripheral wall 112a and partition wall 13a. A catching chamber 13e is formed between the partition wall 13a and peripheral wall 12a, and furthermore, an inlet 13c is located in one end and the outlet 13d is in another end.

A gasket 15 is bonded on a back face of the top cover 14. The gasket 15 is provided so as to keep airtightness of the HDD 10 against the outside, but the gasket 15 according to this embodiment also provides a gasket 15b in a direction of facing the partition wall 13a of the base 12. Thus, it is a characteristic of this embodiment that the gasket 15b is provided as a second gasket section besides the looped gasket 15a as a first existing gasket section conventionally existing, around the catching mechanism 13.

A cross section of the vicinity of the catching mechanism 13 is shown in FIG. 5B. Through the gasket 15a, the peripheral wall 12a and top cover 14 of the base 12 contact with each other, and through the gasket 15b, the partition wall 13a and top cover 14 of the catching mechanism 13 contact with each other. Furthermore, as shown in FIGS. 2 and 3, the gaskets 15a and 15b that form a closed loop surround the catching chamber 13e of the catching mechanism 13. Therefore, airtightness between the catching chamber 13e of the catching mechanism 13 and the disk container 12b is enhanced more than that of a conventional HDD.

Figure 6:
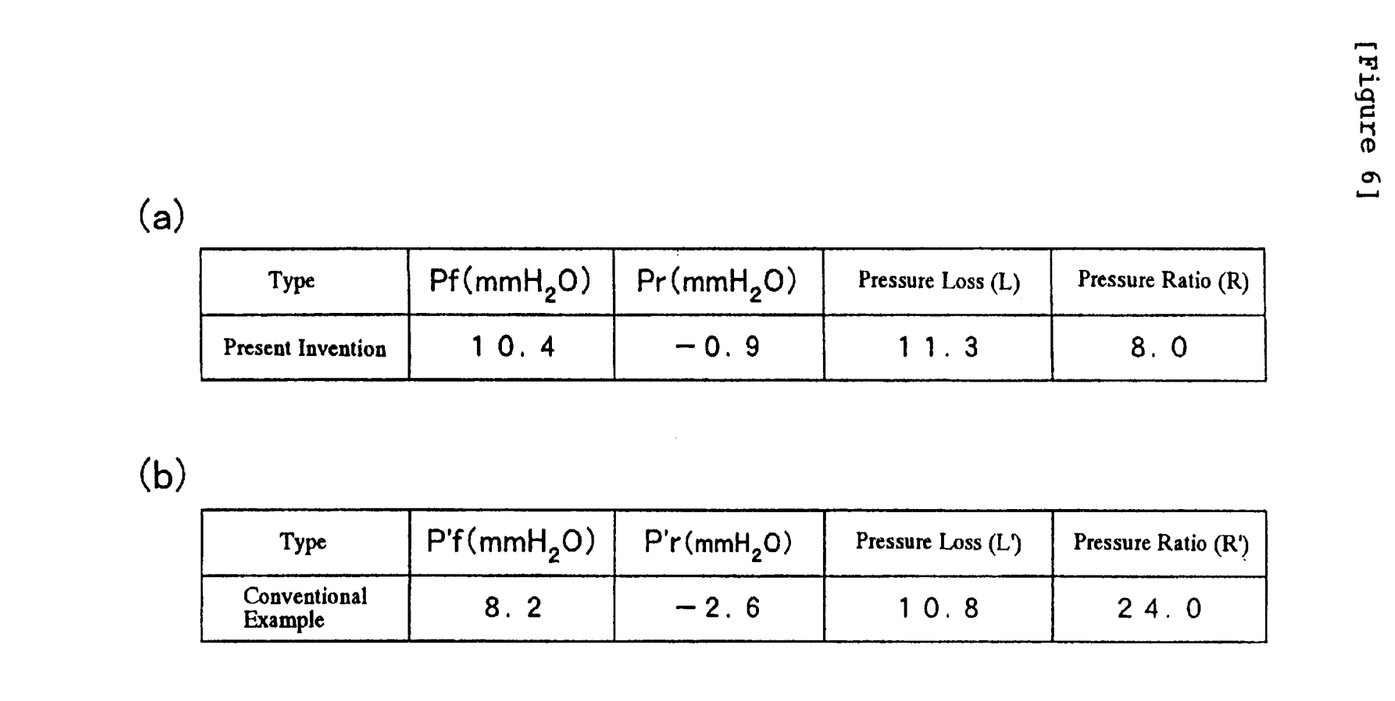
FIGS. 6A and 6B are tables comparing the pressure measurement readings of the HDD of the present invention and a conventional HDD.

Using the HDD 10 according to this embodiment, the pressures before and after the above-mentioned filter 13b, Pf and Pr, were measured to measure a pressure drop (L), and a pressure ratio (R). In addition, the pressure ratio (R) is a value obtained from Pr/L. In addition, using a conventional HDD similar to the HDD 10 according to this embodiment except not providing the gasket 15b, the pressures before and after the filter 13b, P'f and P'r, were measured to measure a pressure drop (L'), and a pressure ratio (R'). Their results are shown in FIG. 6A for this embodiment and in FIG. 6B for the conventional example. From FIG. 6, in the HDD 10 according to this embodiment, Pf is 10.4 mm H20, and hence it can be seen that the pressure before filter 13b becomes higher than that of the conventional HDD that has not the gasket 15b. In addition, finding an improvement effect E about pressure losses (L, L') from E=L'/L, it is E=1.05, and hence the improvement of 5% is obtained. Moreover, with paying attention to the pressure ratios (R, R'), that of the HDD 10 according to this embodiment is 8.0 for 24.0% of the conventional HDD, and hence it can be seen that a bigger pressure ratio is obtained at the rear of the filter 13b.

Furthermore, according to specifications of IDEMA, cleanup time was measured. In consequence, although the cleanup time of the conventional HDD was 13 seconds, the HDD 10 according to this embodiment was 12 seconds, and hence it was confirmed that the enhancement of the dust collection efficiency was achieved.

It can be seen that, by forming a wall isolating the catching chamber 13e and disk container 12b from each other like the HDD 10 according to this embodiment, as described above, through closely contacting the partition wall 13a of the catching mechanism 13 and the top cover 14 through the gasket 15b, the dust collection efficiency in HDD 10 can be improved.

By the way, as shown in FIG. 5B, in the HDD 10 according to this embodiment, the height of the partition wall 13a of the catching mechanism 13 is made to be lower than that of the peripheral wall 12a of the base 12. This is to keep the airtightness against the outside by the gasket 15 provided on the top cover 14. Thus, by screwing the top cover 14 to the base 12, the gasket 15a provided in the top cover 14 is pressed to a top face of the peripheral wall 12a of the base 12, and the gasket 15b is pressed to a top face of the partition wall 13a of the catching mechanism 13. At this time, if the contact pressure of the gasket 15b to the partition wall 13a becomes needlessly high, the base 12 is bent higher in a periphery area than the partition wall 13a, and hence there is a possibility that the airtightness by the gasket 15a deteriorates. Nevertheless, if the height of the partition wall 13a is made to be lower than the height of the peripheral wall 12a, there is not a possibility that the airtightness by the gasket 15b deteriorates because the contact pressure by the gasket 15a against the peripheral wall 12a becomes dominant over the contact pressure by the gasket 15b against the partition wall 13a. Hence, it is desirable to set the height of the partition wall 13a of the catching mechanism 13 lower than that of the peripheral wall 12a of the base 12.

In the embodiment shown in FIG. 5B, assuming that the height of the gaskets 15a and 15b is equal, the height of the partition wall 13a is made to be low than that of the peripheral wall 12a. Nevertheless, assuming that the height of the peripheral wall 12a and partition wall 13a is equal, as shown in FIG. 5C, by setting the height of the gasket 15b, closely contacted to the partition wall 13a, lower than that of the gasket 15a closely contacted to the peripheral wall 12a, it is possible to obtain an effect similar to that in FIG. 5B.

In the above-described HDD 10, the gasket 15 is bonded with adhesive on the top cover 14. Nevertheless, it is sufficient as the gasket 15 that the gasket 15 intervenes between the peripheral wall 12a of the base 12 and the top cover 14 and can keep the internal airtightness of the HDD 10. Hence, the gasket 15 can be bonded on the top face of the peripheral wall 12a of the base 12, or can be located between the base 12 and top cover 14 without bonding the gasket 15 on the base 12 or top cover 14.

Figure 7:
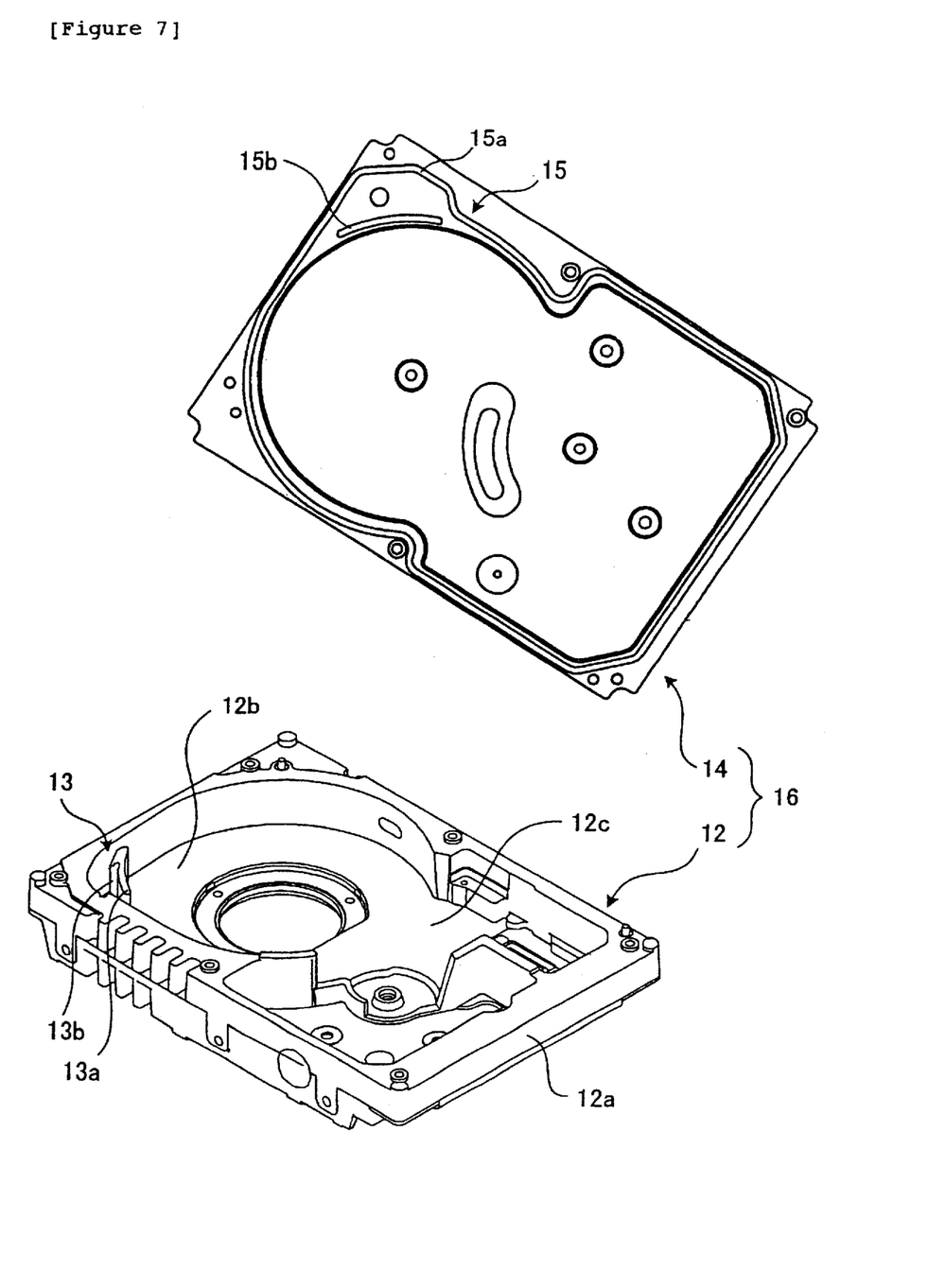
FIG. 7 is a perspective view of a modified example of a gasket.

Furthermore, in the HDD 10, the gasket 15b is unified with the gasket 15. Nevertheless, in case of considering only having an effect of the enhancement of a dust collection efficiency, as shown in FIG. 7, it is possible to make the gasket 15b separate from the gasket 15. At this time, the material of the gasket 15b need not be the same as that of the gasket 15. It may be material that exists between the partition wall 13a and top cover 14 and can isolate the catching chamber 13e from the disk container 12b. Nevertheless, there are advantages that, by unifying the gasket 15b with the gasket 15, it is possible to produce the gasket 15 including the gasket 15b in one formation process, and also to simplify adhesion work to the top cover 14.

Figure 8:
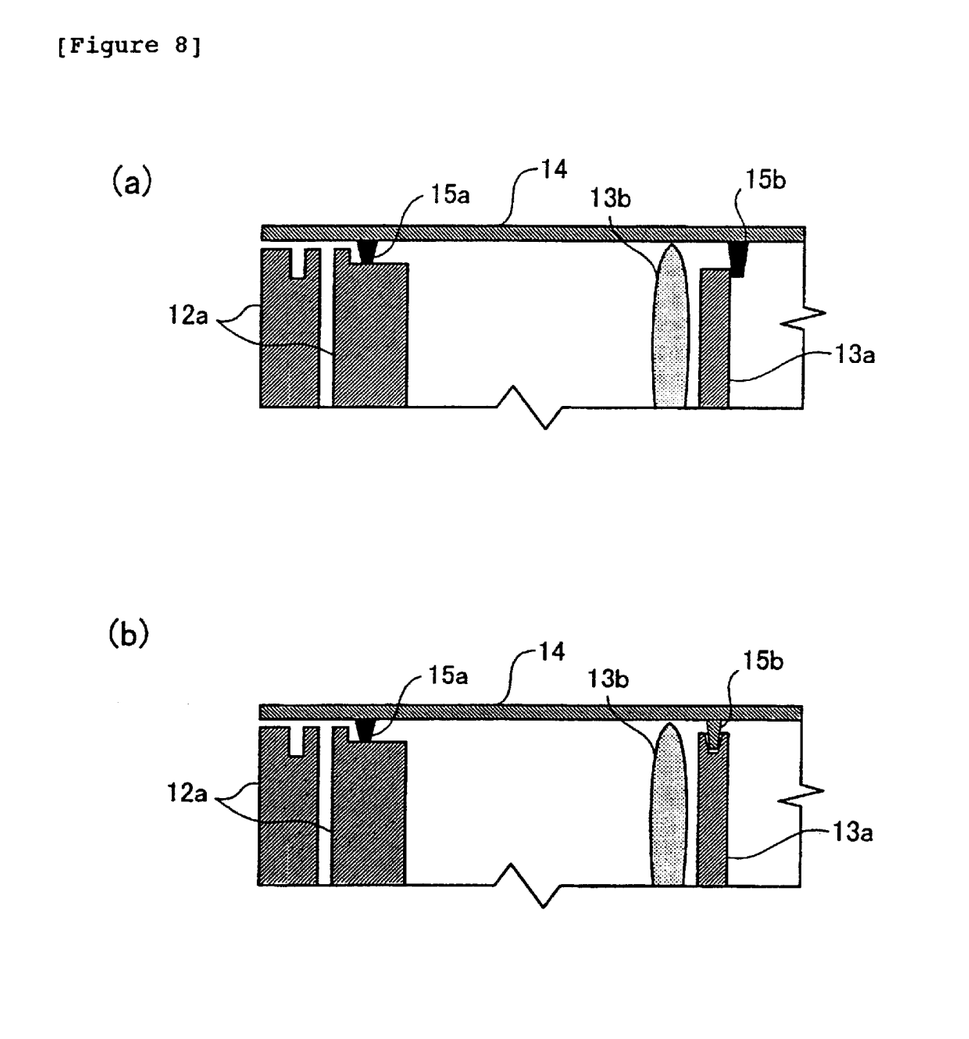
FIGS. 8A and 8B are partial sectional views of another modified example of the gasket.

Furthermore, in the HDD 10, the gasket 15b is contacted to a top face of the partition wall 13a. Nevertheless, it is sufficient in the present invention that the airtightness of the catching chamber 13e can be secured in a radial direction of the magnetic disk 22. Therefore, the contact relation between the gasket 15b and partition wall 13a, as shown in FIG. 5B or FIG. 5C, is not limited to the configuration that the gasket 15b is contacted to the top face of the partition wall 13a. For example, as shown in FIG. 8B, it is possible to enjoy effects of the present invention also by the configuration that the gasket 15b is contacted to the side face of the partition wall 13a.

Moreover, although the gasket 15b made of fluororubber is exemplified in this embodiment, it is possible to adequately select other material. If the base 12 is made by die casting where high accuracy cannot expect, it is desirable to make gasket 15b with material having enough elastic force. If high precision can be obtained, the gasket 15b can be also configured with metal material having higher rigidity than rubber. In this case, for example, as show in FIG. 8B, it is possible to make the configuration that the metal gasket 15b, unified with the top cover 14, is inserted into a groove formed in a top section of the partition wall 13a.

The present invention has several advantages. As described above, the present invention can provide a disk drive apparatus where a dust collection efficiency is improved. This disk drive apparatus enhances the performance of a disk drive apparatus by reducing a collision probability of a data read/write head and dust in connection with acceleration of high-speed rotation of a disk that is a storage medium.

While the invention has been shown or described in only some of its forms, it should be apparent to those skilled in the art that it is not so limited, but is susceptible to various changes without departing from the scope of the invention.

What is claimed is:

1. A disk drive apparatus, comprising:
   a disk medium that is rotationally driven wit a rotation axis as a center and stores data;
   a medium container accommodating the disk medium and having a peripheral wall; and
   a catching chamber catching dust located in an air stream, the catching chamber having a wall isolating the catching chamber from the medium container, an inlet introducing the air stream occurring by rotation driving of the disk medium, and an outlet exhausting the air stream; and wherein
   a height of the wall is lower than a height of the peripheral wall.

2. The disk drive apparatus of claim 1 wherein the wall prevents the air stream from leaking from the catching chamber to the medium container.

3. The disk drive apparatus of claim 1 wherein the catching chamber is located in an outer periphery of the medium container.

4. The disk drive apparatus of claim 1 wherein, in the catching chamber, a filter catching the dust is provided between the inlet and the outlet.

5. A hard disk drive, comprising:
a disk assembly having a disk medium for magnetically storing data, and a spindle motor rotationally driving the disk medium;
an actuator having a magnetic head for storing data in and reproducing data from the disk medium, wherein the magnetic head seeks the disk medium;
a base that accommodates the disk assembly and having a cylindrical disk container with a peripheral wall;
a catching chamber which has an inlet and an outlet, communicating with the disk container, and a partition wall partitioning the disk container from the inlet and the outlet;
a top cover functioning as a lid of the base;
a first gasket existing between the top cover and the peripheral wall of the base; and a second gasket existing between the top cover and the partition wall of the catching chamber; and wherein
a height of the partition wall is lower than a height of the peripheral wall.

6. The hard disk drive of claim 5 wherein the first gasket and the second gasket are formed in one piece.

7. A gasket mounted in a disk drive apparatus having an interior that is partitioned into a plurality of partitions, comprising:
a first gasket section forming a loop for maintaining an airtightness of the disk drive apparatus from an external environment;
a second gasket section that configures a wall between the plurality of partitions inside the disk drive apparatus and is unified with the first gasket section; and wherein
a height of the second gasket section is lower than a height of the first gasket section.

8. The gasket of claim 7 wherein the disk drive apparatus comprises:
a medium container accommodating a disk medium; and
a catching chamber for catching dust in the disk drive apparatus; and wherein
the second gasket section maintains airtightness between the medium container and the catching chamber.

9. A top cover for a disk enclosure of a hard disk drive with a box-like base, comprising:
a fiat cover body;
a looped first gasket mounted around the cover body for maintaining airtightness of the disk enclosure from an external environment;
a second gasket mounted to the cover body within the loop of the first gasket and between the cover body and a wall in the disk enclosure; and wherein
a height of the second gasket is lower than a height of the first gasket.

* * * * *

UNITED STATES PATENT AND TRADEMARK OFFICE
CERTIFICATE OF CORRECTION

PATENT NO. : 6,657,812 B2
DATED : December 2, 2003
INVENTOR(S) : Serizawa et al.

It is certified that error appears in the above-identified patent and that said Letters Patent is hereby corrected as shown below:

Column 8,
Line 55, please remove the word "wit" and insert the word -- with -- between the words "driven" and "a".

Column 9,
Line 25, please remove the word -- and -- between the words "base," and "a".

Signed and Sealed this

Twenty-fourth Day of February, 2004

JON W. DUDAS
*Director of the United States Patent and Trademark Office*